(12) United States Patent
Magatti et al.

(10) Patent No.: US 11,147,411 B2
(45) Date of Patent: Oct. 19, 2021

(54) BEVERAGE PREPARATION MACHINE WITH TWO-LIQUID CIRCUITS AND ELECTRONIC DEVICE FOR CONTROLLING THE SAME

(71) Applicant: NESTEC S.A., Vevey (CH)

(72) Inventors: Marco Magatti, Lausanne (CH); Blaise Rithener, La Tour-de-Peilz (CH)

(73) Assignee: Societe des Produits Nestle S.A., Vevey (CH)

( * ) Notice: Subject to any disclaimer, the term of this patent is extended or adjusted under 35 U.S.C. 154(b) by 276 days.

(21) Appl. No.: 16/091,616

(22) PCT Filed: Mar. 28, 2017

(86) PCT No.: PCT/EP2017/057279
§ 371 (c)(1),
(2) Date: Oct. 5, 2018

(87) PCT Pub. No.: WO2017/174399
PCT Pub. Date: Oct. 12, 2017

(65) Prior Publication Data
US 2019/0117011 A1  Apr. 25, 2019

(30) Foreign Application Priority Data

Apr. 7, 2016  (EP) .................................... 16164184

(51) Int. Cl.
*A47J 31/40* (2006.01)
*A47J 31/46* (2006.01)
(Continued)

(52) U.S. Cl.
CPC ......... *A47J 31/407* (2013.01); *A47J 31/4403* (2013.01); *A47J 31/465* (2013.01);
(Continued)

(58) Field of Classification Search
CPC .... A47J 31/407; A47J 31/521; A47J 31/5253; A47J 31/5255; A47J 31/469; A47J 31/4403; A47J 31/465; A47J 31/52
See application file for complete search history.

(56) References Cited

U.S. PATENT DOCUMENTS

| 8,974,846 B2 | 3/2015 | Burton-Wilcock et al. |
| 9,051,162 B2 | 6/2015 | Peters et al. |

(Continued)

FOREIGN PATENT DOCUMENTS

| EP | 1637055 | 3/2006 |
| WO | 0112039 | 2/2001 |

(Continued)

*Primary Examiner* — Brian W Jennison
(74) *Attorney, Agent, or Firm* — K&L Gates LLP

(57) ABSTRACT

The present invention relates to a beverage preparation machine (10) for preparing a liquid beverage from a cartridge, the machine comprising a first liquid supply circuit (13) configured for selectively providing liquid of predefined temperature and/or volume from a liquid reservoir (22) of the machine (10) to a cartridge inserted into the machine, a second liquid supply circuit (14) configured for selectively providing liquid of predefined temperature and/or volume from the liquid reservoir (22) of the machine to a liquid delivery outlet (11b) of the machine, a control unit (15) for controlling the first and second liquid supply circuit (13, 14), and a network unit (16) comprising a network interface for communication with an external electronic device (1) over a network, wherein the control unit (15) is configured to individually control the selective provision of liquid from the first and the second liquid supply circuit (13, 14) in response to information obtained via the network unit (16).

20 Claims, 4 Drawing Sheets

(51) Int. Cl.
 A47J 31/52 (2006.01)
 A47J 31/44 (2006.01)
(52) U.S. Cl.
 CPC ............ *A47J 31/469* (2018.08); *A47J 31/52* (2013.01); *A47J 31/521* (2018.08); *A47J 31/5253* (2018.08); *A47J 31/5255* (2018.08)

(56) References Cited

U.S. PATENT DOCUMENTS

| | | | |
|---|---|---|---|
| 2006/0286262 A1* | 12/2006 | Stearns | A47J 31/41 426/596 |
| 2011/0108162 A1 | 5/2011 | Yoakim et al. | |
| 2013/0276636 A1 | 10/2013 | Rithener et al. | |
| 2016/0055599 A1* | 2/2016 | Illy | A47J 31/4414 705/15 |
| 2018/0206669 A1* | 7/2018 | Ayoub | A47J 31/3685 |
| 2018/0365924 A1 | 12/2018 | Yoakim | |

FOREIGN PATENT DOCUMENTS

| | | |
|---|---|---|
| WO | 2013124188 | 8/2013 |
| WO | 2015197615 | 12/2015 |

* cited by examiner

BEVERAGE PREPARATION MACHINE WITH TWO-LIQUID CIRCUITS AND ELECTRONIC DEVICE FOR CONTROLLING THE SAME

CROSS REFERENCE TO RELATED APPLICATIONS

The present application is a National Stage of International Application No. PCT/EP2017/057279, filed on Mar. 28, 2017, which claims priority to European Patent Application No. 16164184.0, filed on Apr. 7, 2016, the entire contents of which are being incorporated herein by reference.

FIELD OF THE INVENTION

The present invention relates to a beverage preparation machine designed for preparing a beverage from a cartridge such as a coffee capsule and to an electronic device networked to such machine, and more particularly to a system for individually controlling liquid circuits of the beverage preparation machine for preparing a variety of beverages.

BACKGROUND OF THE INVENTION

Beverage preparation machines for preparation of a beverage by means of a beverage ingredients containing cartridge such as a coffee capsule are well-known in the prior art. These beverage preparation machines are usually equipped with a liquid circuit for injecting liquid into the cartridge that can be selectively provided into the machine. Upon provision of liquid into the cartridge, the liquid is made to interact with the beverage ingredients held in the cartridge, e.g. by means of dissolution and/or extraction, and the resulting beverage is then made to leave the cartridge in order for being provided to a receptacle. The cartridge is usually designed for providing a single-serving of beverage therefrom.

Examples for such beverage preparation machines are described in EP 0521397, EP1764014, and WO2009/113035.

The known beverage preparation machines for use with such cartridges comprise a brewing unit for receiving the cartridge and which is connected to a liquid supply circuit. The liquid supply circuit usually comprises heating means, a pump for metering liquid into the cartridge and a liquid reservoir. The liquid supply circuit is thus configured for selectively providing heated, pressurized liquid into the cartridge in order to prepare a beverage therefrom. Depending on the ingredients contained in the cartridge, warm or hot beverages such as a coffee or a tea beverage may be prepared by use of such beverage preparation machine.

The increased popularity of these machines is attributed to enhanced user convenience compared to conventional beverage preparation machines such as in particular a manually operated coffee machine. Thereby, by contrast to such manually operated coffee machines, the user merely has to insert a beverage cartridge into the machine and press a dedicated start button in order to conveniently prepare a single serving of the desired beverage without further actions.

In view of the popularity of these machines, there is an increased desire for enabling the preparation of more complex beverages such as beverages composed by a blend of separate liquid portions having different flavor characteristics instead of known uniform beverages, e.g. a simple coffee beverage obtained by a single extract or a tea obtained by a single infused liquid portion. Furthermore, there is need for further individualization of beverages prepared by the machine, e.g. by individually varying the taste of the particular beverage prepared by the machine. This appears however not possible with the known beverage preparation machines without increasing the complexity and thus negatively affecting the usability of the machine, e.g. by provision of a complex user interface at the machine.

It is therefore an aim of the present invention to provide an enhanced beverage preparation machine and a method of operating the same, which enables the preparation of more complex and individualized beverages, e.g. "Americano" coffee, while at the same time providing enhanced user convenience.

The present invention seeks to address the above-described problem. The invention also aims at other objects and particularly the solution of other problems as will appear in the rest of the present description.

SUMMARY OF THE INVENTION

In a first aspect, the invention relates to a beverage preparation machine for preparing a liquid beverage from a cartridge, the machine comprising a first liquid supply circuit configured for selectively providing liquid of predefined temperature and/or volume from a liquid reservoir of the machine to a cartridge inserted into the machine, a second liquid supply circuit configured for selectively providing liquid of predefined temperature and/or volume from the liquid reservoir of the machine to a liquid delivery outlet of the machine, a control unit for controlling the first and second liquid supply circuit, and a network unit comprising a network interface for communication with an external electronic device over a network, wherein the control unit is configured to individually control the selective provision of liquid from the first and the second liquid supply circuit in response to information obtained via the network unit.

The present invention enables the preparation of more complex beverages due to the provision of a first and a separate second liquid supply circuit which are preferably individually controllable by the control unit of the machine. Accordingly, composite beverages may be prepared, which are constituted by a flavour containing first portion provided by the first liquid supply circuit and by a second portion, preferably hot water, provided by the second liquid supply circuit.

The present beverage preparation machine is thus in particular enabled to prepare an enhanced "Americano" coffee beverage in which a coffee beverage, in particular an espresso is mixed with an additional amount of hot water of desired temperature and volume in a common receptacle. Thereby, the flavour containing portion of the beverage is prepared by means of beverage ingredients containing cartridge that may be selectively provided to a brewing unit of the beverage preparation machine.

Due to the provided network unit, the beverage preparation machine may be connected to an external electronic device over a network connection such as to control the control unit of the beverage preparation machine and thus control the first and second liquid supply circuit. Accordingly, a complex user interface at the machine is prevented and the machine may be conveniently controlled via a dedicated external electronic device such as a handheld device, e.g. a smartphone, a tablet or a stand-alone control unit connectable to the beverage preparation machine. The user interface for individually controlling the first and second liquid supply circuit of the beverage preparation machine is thus provided at the external electronic device. For this purpose, the electronic device may comprise a dedicated computer program respectively an application ("app") for conveniently enabling a control of the beverage preparation machine and which will be further described below.

In a preferred embodiment, the liquid delivery outlet of the second liquid supply circuit and a beverage delivery outlet of the first liquid supply circuit are arranged such as to deliver the respective liquids into a common receptacle. The liquid delivery outlet of the second liquid supply circuit and the beverage delivery outlet of the first liquid circuit are preferably arranged in close vicinity to each other at the beverage preparation machine. Alternatively, the first and second liquid supply circuit may as well terminate in a common liquid delivery outlet of the machine.

The first liquid supply circuit is designed for preparing a flavour containing beverage, such as in particular a coffee or tea beverage by injection of cold or heated liquid into a beverage ingredients containing cartridge that may be selectively inserted into a brewing unit of the beverage preparation machine.

The second liquid supply circuit is preferably designed for providing a cold or heated liquid such as in particular water and/or milk. The second liquid supply circuit may as well comprise a brewing unit for selectively receiving a beverage ingredients containing cartridge.

The first and second liquid supply circuits are preferably designed for providing heated liquids at independently controllable temperatures and volumes.

The first and second liquid supply circuits preferably each comprise a pump and a heating unit. The heating unit of the first liquid supply circuit is preferably an in-line type heater such as a thermoblock or heating tube. For power management reasons, the heating unit of the second liquid supply circuit is preferably a boiler. The heating unit of the second liquid supply circuit can also be a thermoblock or heating tube. The liquid pump of the first and second liquid supply circuit may be a reciprocating or a rotary pump. The respective pump is preferably driven by an electrical motor or an induction coil.

The first and second liquid supply circuit preferably further comprise a liquid supply reservoir such as a water tank. The first and second liquid supply circuits may each comprise a separate liquid reservoir or may be connected to a common liquid reservoir. The liquid reservoir is preferably selectively connectable to a dedicated connector of the beverage preparation machine.

The control unit of the beverage preparation machine is preferably configured to individually control the temperature and/or volume of the respective liquid delivered from the first and second liquid supply circuit. For this purpose, the control unit is preferably connected to the respective heating means and/or the respective pump of the first and second liquid supply circuit.

In a preferred embodiment, the control unit is configured to individually set the temperature of the liquid delivered by the first and/or second liquid supply circuit to a value between 70° C. and 95° C., preferably between 80° C. and 90° C. The heating means of the respective liquid supply circuits are preferably arranged for individually setting the temperature of the liquid delivered from the respective liquid circuits in response to a dedicated control signal of the control unit.

The control unit may be designed to control the respective heating means such as to deliver water at cold or ambient temperature from at least one of the first and second liquid supply circuit, while the respective heating means of the other liquid supply circuit is controlled to deliver water at an elevated, warm or hot temperature within the temperature range as described above. A resulting in-cup temperature of the resulting composite beverage may thus lie below the above-identified temperature range.

In a particular preferred embodiment, the heating means of the first liquid supply unit are controlled for heating the liquid at least from two to six distinct temperature values between 80 and 90° C., such as e.g. 80° C., 82° C., 84° C., 86° C., 88° C. and 90° C.

In a particular preferred embodiment, the heating means of the second liquid supply unit may also be controlled for heating the liquid at least to two to six distinct temperature values between 80° C. and 90° C., such as e.g. 80° C., 82° C., 84° C., 86° C., 88° C. and 90° C.

The control unit is preferably configured to individually control the pump of the first and second liquid supply circuit. The control unit is preferably configured to activate the respective pump of the first and second liquid supply circuit in a desired sequence. According to such embodiment, a user of the machine may choose whether the flavour containing portion of the resulting beverage prepared by the first liquid circuit or the liquid from the second liquid circuit is provided first to the common receptacle. In a particular preferred embodiment, a user may choose between the options "water first", provided by the second liquid supply circuit, or "coffee first", provided by the first liquid supply circuit. This leads in particular to a different "crema" of the resulting "Americano" coffee beverage and enables to address taste preferences of a consumer.

In an alternative embodiment, the respective pumps of the first and second liquid supply circuit may be activated by the control unit simultaneously.

The first and/or second liquid supply circuit may comprise a flow sensor for detecting an actual flow of liquid through the respective liquid supply circuits and for providing a dedicated feedback signal to the control unit. The flow sensor may be configured for measuring a liquid flow rate through the respective liquid circuit and/or the amount of liquid delivered during a beverage preparation process.

The first and/or second liquid supply circuit may comprise a temperature sensor for detecting an actual temperature of the liquid supplied by the respective liquid supply circuit and for providing a dedicated feedback signal to the control unit.

The beverage preparation machine preferably comprises a beverage brewing unit to which the cartridge may be selectively provided. The brewing unit is preferably comprised by the first liquid supply circuit and may comprise dedicated inlet opening means such as an injection needle designed to open an inlet face of the cartridge. The brewing unit preferably further comprises outlet opening means that may open an outlet face of the cartridge e.g. upon rise in pressure within the cartridge.

The cartridge for being used with the beverage preparation machine is preferably suitably dimensioned for being received in the brewing unit of the machine. The cartridge preferably comprises an internal volume holding a pre-portion amount of beverage or foodstuff ingredients. The cartridge is preferably a single-use cartridge, i.e. it is intended to be used in a single preparation process after which it is preferably rendered unusable, e.g. by perforation, penetration, removal of a lid or exhaustion of said material. The cartridge is preferably a coffee capsule of known type and may comprise an internal volume of between 5 to 80 ml.

The network interface is preferably a wireless interface. The network interface is designed for data transfer, preferably bi-directional data transfer. The network interface is preferably generally operable to transmit and receive wireless signals by radio waves. The network interface of the machine is preferably a wireless interface, e.g. a Wireless local area network (WLAN) interface such as Bluetooth or WiFi or a near-field-communication network interface. The network interface may as well comprise a wired interface, such as at least one selected from a group consisting of: RS-232; USB; I2C; wired local area network interface or another suitable wired interface.

The beverage preparation machine preferably comprises a user interface. The user interface preferably comprises at least a start/stop button in order to selectively start or stop a beverage preparation process, and/or an on/off switch. The user interface is preferably void of any complex user interface such as in particular a touch-screen and/or a touch-display. The user interface preferably comprises not more than 2-3 buttons. Accordingly, the complexity of the user interface at the machine is reduced. Further, a very compact machine as home appliance can be provided.

In an alternative embodiment, the beverage preparation machine itself may comprise a dedicated user interface which is configured for individually setting a temperature and/or volume parameter for a first and second liquid supply circuit of the beverage preparation machine. The user interface may further be configured for setting a sequence of delivery of liquid from the first and second liquid supply circuit during a beverage preparation process. The user interface may further comprise a start and/or stop button in order to enable a selective start or stop of the beverage preparation machine. The user interface may be a touch-screen and/or a touch-display.

In a second aspect, the invention relates to a computer program executable on an electronic device, said program being configured to:
  obtain via a network unit of the electronic device a network connection to a beverage preparation machine,
  display a control interface for individually setting a temperature and/or volume parameter for a first and second liquid supply circuit of the beverage preparation machine, and
  transmit via the network connection the respective temperature and/or volume parameter for the first and second liquid supply circuit to the beverage preparation machine.

The computer program thus provides a convenient control over the parameters for the first and second liquid supply circuit of the beverage preparation machine remote from the machine. Accordingly, the costs and necessary space at the machine for a complex user or control interface at the beverage preparation machine may be omitted. Furthermore, the program is preferably executable on a generally available electronic device such as a smartphone or tablet. Hence, a user of the machine does not have to additionally buy expensive hardware for controlling the machine.

The computer program may as part of its execution be configured to automatically obtain a network connection between the electronic device and the network unit of the beverage preparation machine. Said connection may comprise using a known protocol for data transfer, e.g. TCP or DHP. The computer program may as well be configured for selectively obtain a network connection between the electronic device and the network unit of the beverage preparation machine, i.e. upon a dedicated user request such as the pressing of a dedicated "connect" button in the displayed control interface.

The program is preferably configured to obtain a parameter regarding a sequence of delivery of the respective liquids from the first and second liquid supply circuit and transmit the respective parameter to the beverage preparation machine. Accordingly, the user of the program may conveniently set the desired sequence of in-cup delivery such as e.g. "coffee first" or "water first" for an "Americano" coffee beverage.

The program may be configured to obtain from a storage unit of the beverage preparation machine or the electronic device predefined default values for the respective parameters that may be selectively adapted by a user via the control interface. The default values may be stored in a memory unit of the beverage preparation machine or the electronic device. The default values may correspond to the parameters as used for the latest beverage preparation with the connected beverage preparation machine. The default values as stored in the respective memory unit may be adaptable upon user input via the electronic device.

The computer program may be adapted for attributing a respective parameter set, preferably at least the parameters concerning the temperature and/or volume and/or the sequence of liquid delivery from a first and second liquid supply circuit of the machine, to a beverage preparation profile that is saved to and selectively retrievable from a beverage library stored in a storage unit of the beverage preparation machine or of the electronic device. Accordingly, the user of the program may create a multitude of various beverage preparation profiles to which different values for the respective control parameters may be attributed. These beverage preparation profiles may for example correspond to different composite beverages such as "Americano", "Lungo", "Caffè latte" etc., which may be stored under a desired name by the user of the program.

The computer program may as part of its execution be configured to automatically or upon user request obtain a network connection between the electronic device and a remote resource such as an external server or cloud server. Said connection may comprise using a known protocol for data transfer, e.g. TCP or DHP and may be established over a cellular network (e.g. UMTS, LTE, etc.) and/or the internet.

The computer program may be configured to upload and/or download information regarding the beverage preparation machine and/or the parameters for controlling the beverage preparation machine to or from such external server. The remote resource may be a server system (e.g. embodied as hardware and/or software), a peer to peer network or other distributed system. The remote resource is preferably arranged at a different location to the electronic device and the beverage preparation machine.

In a preferred embodiment, the computer program is configured to selectively and/or automatically retrieve beverage preparation profiles respectively beverage recipes from the remote resource. The beverage preparation profiles contain beverage preparation parameters and preferably at least the parameters concerning the temperature and/or volume and/or the sequence of liquid delivery from a first and second liquid supply circuit of the machine. The beverage preparation profiles from the remote resource may be stored automatically or upon user selection to a beverage library in a storage unit of the electronic device or of the beverage preparation machine. The beverage preparation profiles may be created by a distributor of the flavour containing cartridges and uploaded onto the remote resource for download by consumers. The beverage preparation profiles may be adapted/updated periodically.

Accordingly, a large variety of different beverage creations or recipes, which comprise predefined and/or adaptable values for the respective beverage preparation parameters, may be provided on the remote resource. The beverage profiles may either be offered for download or may be downloaded automatically by the computer program. Accordingly, a consumer is enabled to access a very large library of different beverage creations and may for example selectively download beverage creations for his/her specific taste preferences.

It is also possible that new beverage creations or recipes may automatically be distributed by the remote resource to the computer program respectively the electronic device when connected thereto. This is for example advantageous when new ingredients containing cartridges for use with the machine are released on the market. The new beverage recipes may then be specifically adapted to the flavour providing ingredients in the cartridges.

In addition, the consumer may as well upload beverage preparation profiles that are created with the computer program to the remote resource. These individual creations may then be stored at the remote resource and downloaded by other consumers. Accordingly, a consumer may share his/her favorite beverage creations via the computer program and the remote resource.

The control interface as displayed by the computer program is preferably configured for individually setting and/or adapting the parameter value for liquid volume supplied by the first liquid supply circuit and/or the parameter value for liquid volume supplied by the second liquid supply circuit. The parameter value for liquid volume provided by the first liquid supply circuit is preferably configured for being set between 1 and 150 ml, preferably between 10 and 110 ml. The parameter value for liquid volume supplied by the second liquid supply circuit is preferably configured for being set between 1 and 350 ml, preferably between 10 and 300 ml.

The control interface is preferably configured for setting and/or adapting the individual temperature of liquid provided by the first and second liquid supply circuit during beverage preparation.

In an alternative embodiment, the control interface may be configured for setting and/or adapting the resulting temperature of the liquid obtained from the first and second liquid supply circuit, i.e. the resulting in-cup temperature of the composite beverage. The respective individual temperatures for liquid delivered by the first and second liquid supply circuits in this case may be set by a processing unit of the control unit of the machine or of the electronic device, dependent on the set combined temperature. The combined temperature may be set within a range from 45° C. to 110° C., preferably from 65° C. to 95° C.

The computer program is preferably configured to receive a user command to adjust the respective control parameters, preferably liquid temperatures and volumes, of the beverage preparation machine and in particular of the first and second liquid supply circuits as described above. The computer program is preferably further configured to start a beverage preparation process with the selected and/or adjusted parameters upon receiving a dedicated user command such by pressing of a "start" button on the displayed control interface.

The computer program may be configured for automatically, or upon user request, obtaining information regarding the actual operational parameters of the machine such as e.g. a current temperature value for the respective first and second liquid supply circuit and/or a value relating to the actual flow rate or a set parameter for the liquid volume for the respective first and second liquid supply circuit. Accordingly, the computer program may retrieve from the beverage preparation machine actual values that may be adapted in the control interface of the computer program upon user input.

The computer program may be configured for automatically or upon user request obtain information regarding beverage preparation parameters of beverage preparation profiles and the attributed parameters and store said beverage preparation profiles to the memory unit of the electronic device and/or the beverage preparation machine. New beverage creations may thus be conveniently retrieved by the user and may be selectively applied for beverage preparation with the machine. The beverage preparation profiles may be retrieved from a remote resource to which the electronic device is connectable.

The computer program described above may be implemented, in various manners, using digital electronic logic, for example, one or more ASICs or FPGAs, one or more units of firmware configured with stored code, one or more computer programs or other software elements such as modules or algorithms, or any combination thereof. One embodiment may comprise a special-purpose computer specially configured to perform the functions described herein and in which all of the functional units comprise digital electronic logic, one or more units of firmware configured with stored code, or one or more computer programs or other software elements stored in storage media.

In a further aspect, the invention relates to a non-transient computer readable medium comprising the computer program according to the second aspect of the invention. The non-transitory computer readable medium may comprise a memory unit associated with a processor of the electronic device or other computer-readable storage media for having computer readable program code stored thereon for programming a computer, e.g. a hard disk, a CD-ROM, an optical storage device, a magnetic storage device, Flash memory, or a storage device of a server for download of said program.

In a further aspect, the invention relates to an electronic device comprising the computer program as described above. The electronic device can be any electronic device with at least one network interface for communicating with a beverage preparation machine.

For example, the electronic device may comprise (or can be included in) at least one selected from a group consisting of a desktop computer, a laptop computer, a server, a media player (such as an MP3 player), a subnotebook/netbook, a tablet computer, a smartphone, a cellular telephone, a set-top box, a personal digital assistant (PDA), a game console, and/or another electronic device. In a preferred embodiment, the electronic device is a portable small form factor device respectively a handheld device such as a smartphone, a PDA or a tablet computer.

The electronic device preferably comprises a processing unit, a memory unit, a network unit, a display unit and/or an input/output (I/O) system. The input/output system may be comprised by the display unit such as e.g. in the form of a touchscreen.

The electronic device for being connected to the beverage preparation machine is thus designed for providing a convenient user interface by means of which the beverage preparation parameters and in particular the parameters relating to the temperature and/or the volume of liquid provided by the first and second liquid circuits of the beverage preparation machine may be remotely set respectively adjusted. Accordingly, an individual beverage may be prepared by the user of the device while avoiding the provision of a complex user interface at the machine.

The electronic device is preferably configured for being selectively connected with a beverage preparation machine by means of its network unit. The electronic device may be configured for selectively being associated with more than one beverage preparation machine, whereby the parameter values for controlling the respective machine may be adapted, stored and managed individually for each machine. The electronic device and the beverage preparation parameters stored thereon may thus be used for beverage preparation at various beverage preparation machines that are equipped with a dedicated network unit. A user may thus define his preferred beverage preparation parameters, store them into a desired beverage preparation profile on the storage unit of the electronic device and may use the particular profile for beverage preparation at any machine suitable for interacting with the electronic device.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF THE FIGURES

Figure 1:
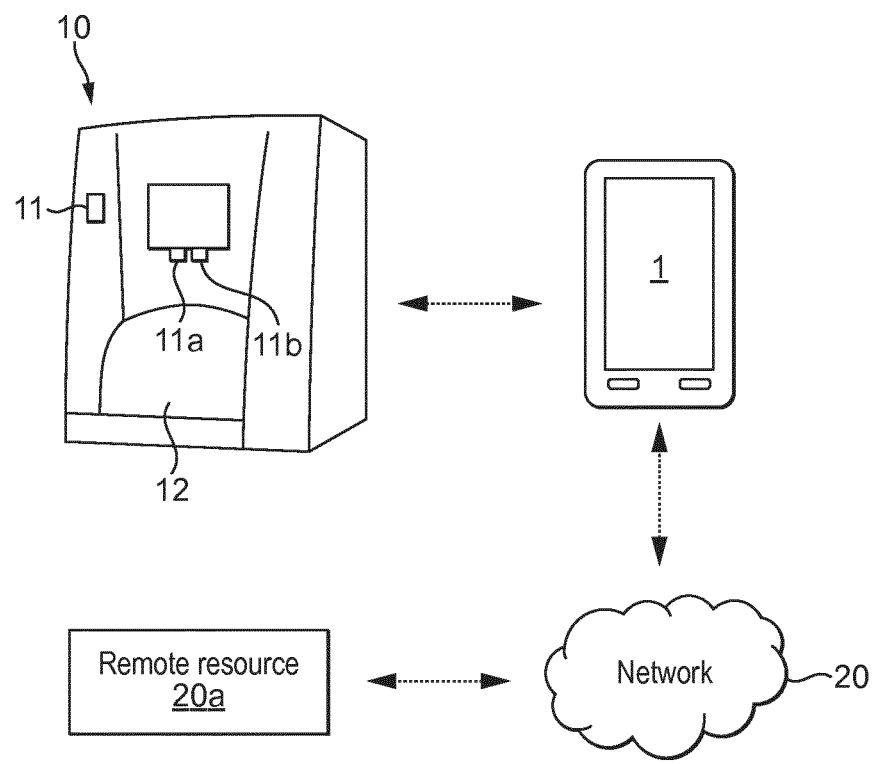
FIG. 1 is a schematic illustration of a beverage preparation machine coupled to an electronic device according to the present invention.

FIG. 1 relates to a schematic illustration of a system according to the present invention, the system comprising a beverage preparation machine 10 and an electronic device 1. The electronic device 1 and the beverage preparation machine 10 are preferably designed for communicating via wireless signals. For this purpose, the beverage preparation machine 10 and the electronic device 1 preferably each comprise a dedicated network unit 3, 16 (see FIGS. 2 and 4).

The electronic device 1 may be configured for communicating with a remote resource 20a via a network 20. The communication between the electronic device 1 and the remote resource 20a may be via a wireless network such as a cellular network (e.g. UMTS, LTE, etc.) or a WLAN connection.

The beverage preparation machine 10 may as well be configured for communicating with a remote resource 20a, either indirectly, i.e. via the electronic device 1, or directly, i.e. by means of a wired or wireless connection of the network unit 16 of the machine 10 with the remote resource 20a.

The beverage preparation machine 10 is preferably a cartridge-based beverage preparation machine, i.e. a machine that is designed for preparing a beverage upon injection of liquid into a beverage ingredients containing cartridge. The machine 10 is preferably designed for preparing in particular a coffee or tea beverage by means of injection of liquid into a cartridge and draining the resulting beverage therefrom.

Figure 5:
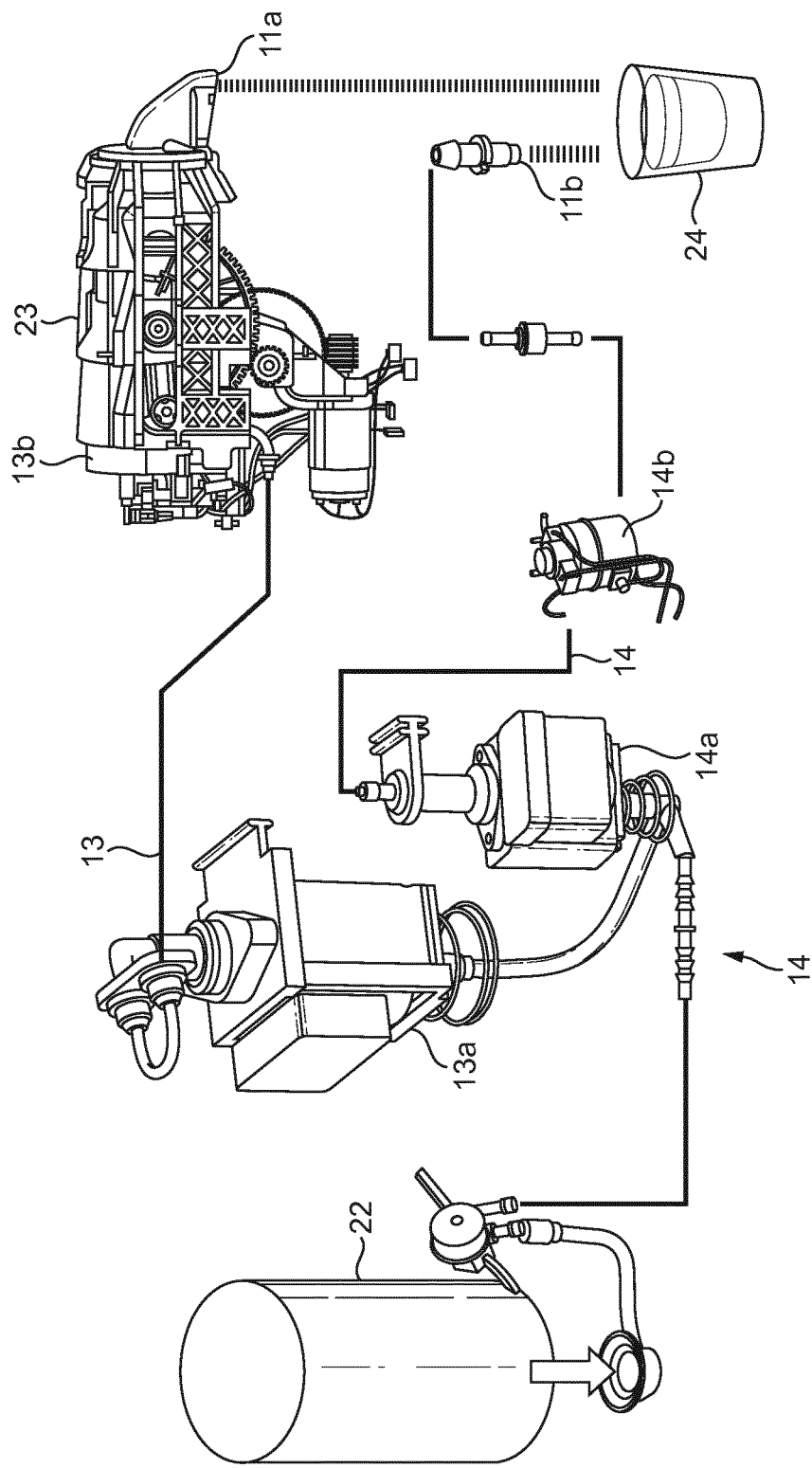
FIG. 5 is a schematic view illustrating the first and second liquid circuits of a preferred embodiment of the beverage preparation machine according to the invention.

The beverage preparation machine 10 preferably comprises a brewing unit 23 for selectively receiving a cartridge therein (see FIG. 5). The machine 10 further comprises a beverage delivery outlet 11a from which the resulting beverage, such as a coffee beverage may be drained. The machine 10 may further comprise an additional liquid delivery outlet 11b from which another beverage component such as hot water may be drained. The beverage delivery outlet 11a and the liquid delivery outlet 11b are preferably arranged in close vicinity to each other such as to enable the draining of the resulting liquid streams into a common receptacle that may be placed onto a receptacle support 12 of the machine 10.

Figure 2:
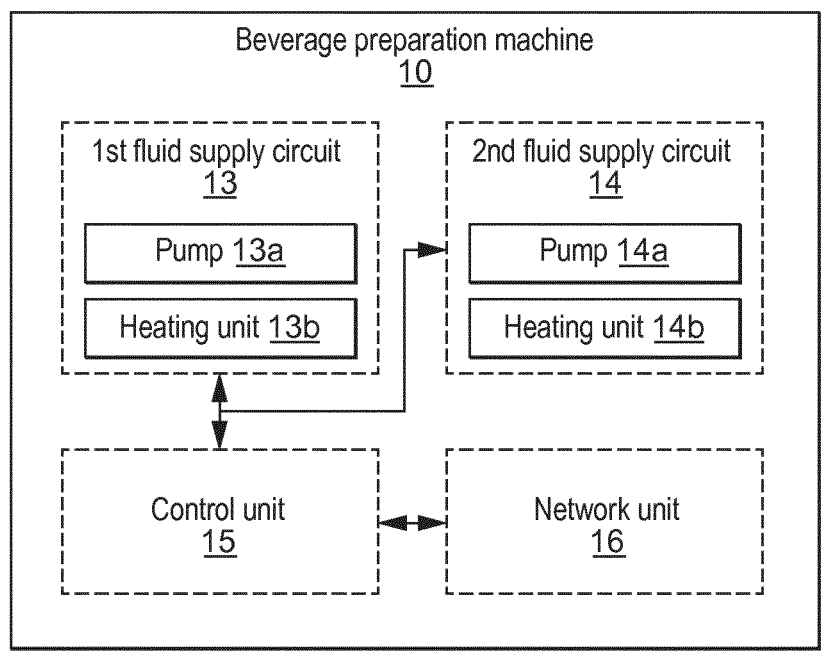
FIG. 2 is a block diagram illustrating a preferred embodiment of the beverage preparation machine according to the invention.

As shown in FIG. 2, the beverage preparation machine 10 comprises a first and a second liquid supply circuit 13, 14 for preparing a beverage. The first and second liquid circuit 13, 14 preferably each comprise a pump 13a, 14a and a heating unit 13b, 14b. The first and second liquid circuits 13, 14 preferably further comprise a liquid reservoir 22 (see FIG. 5). The liquid reservoir may be a common reservoir 22 connected to both the first and the second liquid supply circuit 13, 14.

The beverage preparation machine 10 further comprises a control unit 15 which is connected to the first and second liquid circuit 13, 14. Accordingly, the control unit 15 is designed to individually control an operation of the pump 13a, 14a and/or the heating unit 13b, 14b of the respective first and second liquid supply circuit 13, 14. In particular, the control unit 15 may be designed to set a particular temperature of the respective heating units 13b, 14b and/or to set a particular liquid volume to be transported from the respective liquid circuit to the respective delivery outlet 11a, 11b of the machine 10. The latter is preferably obtained by the control unit 15 activating the respective pump 13a, 14a of the first or second liquid circuit 13, 14 for a predefined time period in order to transport the desired amount of liquid volume during a beverage preparation process.

The beverage preparation machine 10 preferably further comprises a network unit 16. The network unit 16 is preferably designed for communicating wireless with the external electronic device 1 and/or a remote resource 20a. The network unit 16 preferably comprises a wireless interface such as Bluetooth, Wireless local area network (WLAN) or a near-field-communication network interface. The network unit 16 may be designed for establishing a dedicated network connection via a cellular network.

Figure 3:
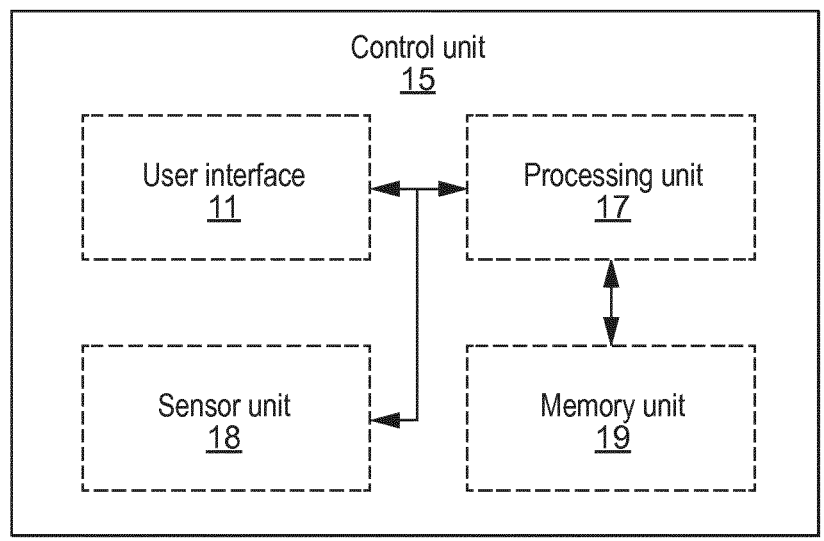
FIG. 3 is a block diagram illustrating a preferred embodiment of a control unit of the beverage preparation machine according to the invention.

As shown in FIG. 3, the control unit 15 of the beverage preparation machine preferably comprises a user interface 11, a processing unit 17, a sensor unit 18 and/or a memory unit 19.

The user interface 11 preferably comprises a start/stop button arranged at a housing of the beverage preparation machine 10. This user interface can be void of any complex interface means such as a touch-screen or a sophisticated display unit.

A processing unit 17 of the control unit 15 is designed for operating the control unit, retrieving operational parameters, e.g. from the electronic device 1 and/or a remote resource 20*a* connected to the machine 10, processing the obtained parameters and effecting a corresponding control of the machine 10.

A memory unit 19 of the control unit 15 is preferably connected at least to the processing unit 17. The memory unit 19 is configured for storing operational parameters of the machine 10. The memory unit 19 may be configured for storing default values for the operational parameters that may be selectively adapted by a user of the machine 10 and/or the electronic device 1.

The control unit 15 may further comprise a sensor unit 18 which is connected to dedicated sensors of the beverage preparation machine 10 and which are designed for providing information in particular regarding the first and second liquid circuit 13, 14 of the machine 10. The sensor unit 18 may be designed for providing information as to an actual temperature value of the liquids supplied by the heating means 13*b*, 14*b* in the first and/or second liquid supply circuit 13, 14. The sensor unit 18 may further be designed for providing information as to an actual liquid flow rate in the first and/or second liquid supply circuit 13, 14. For this purpose, the machine 10 may comprise dedicated temperature and/or liquid flow sensors connected to the respective liquid supply circuits 13, 14.

Figure 4:
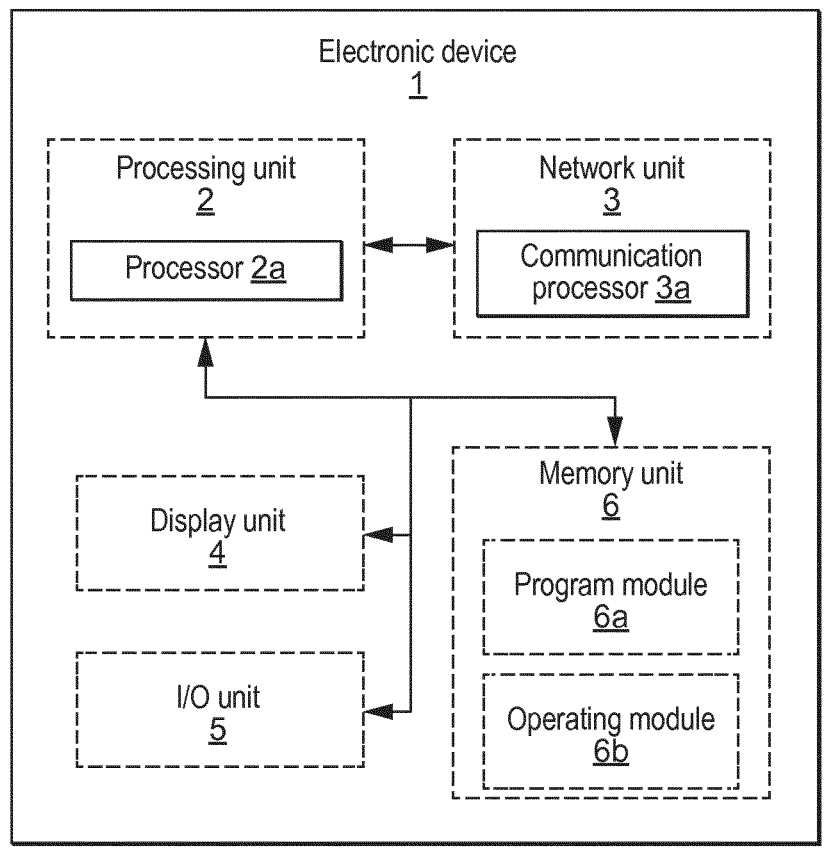
FIG. 4 is a block diagram illustrating a preferred embodiment of the electronic device according to the invention.

FIG. 4 relates to a schematic illustration of an electronic device 1 according to a preferred embodiment of the present invention. The electronic device 1 preferably comprises a processing unit 2 having a processor 2*a* and which is designed for carrying out coded instructions such as a computer program according to the invention.

The device 1 further comprises a network unit 3 which preferably comprises a communication processor 3*a*. The network unit 3 is preferably designed for connecting to the beverage preparation machine 10.

The device 1 further comprises a memory unit 6. The memory unit 6 may comprise a program module 6*a* and an operating module 6*b*. The program module 6*a* and/or the operating module 6*b* may be designed for storing data and/or instructions for the processing unit 2 and the network unit 3. The memory unit 6 may comprise a dynamic random access memory (DRAM), static random access memory (SRAM) and/or other types of memory. The instructions comprise one or more computer programs which are executable by the processing unit 2 as a control interface program. The computer program may be composed of one or more program modules 6*a*. The program modules can be implemented in any suitable manner e.g. as a high-level procedural language, an object orientated language, an assembly or machine language. Moreover said language may be complied or interpreted to be executed by the processing unit 2.

The device 1 preferably comprises a display unit 4 and/or an input/output unit 5. The display unit 4 and the input/output unit may be formed by the same entity such as for example a touch-screen. The input/output unit 5 is preferably designed to enable the displaying of a user control interface for operating the beverage preparation machine. Further, the input/output unit 5 is preferably adapted to enable a user input. For this purpose, the input unit may comprise buttons, touch sensing or screen edge buttons associated with the display or buttons associated with LEDs. Any user commands related to the adjustment of a beverage preparation parameter or a selection of a preparation process are transferred from the input unit 5 to the processing unit 2 as a signal.

The device 1 is thus designed for enabling a user to adapt beverage preparation parameters of the connected machine and initiate a beverage preparation process with the adapted parameters. An example for such user control interface 30 is further discussed with reference to FIG. 6 below.

FIG. 5 relates to a schematic illustration of the first and second liquid supply circuit 13, 14 of the machine. The liquid supply circuits 13, 14 are preferably connected to a common liquid reservoir 22. Each of the first and second liquid supply circuits 13, 14 may comprise a dedicated flow sensor and/or a temperature sensor (not shown). The liquid and beverage delivery outlets 11*a*, 11*b* are arranged such that the resulting liquids delivered from these outlets can be provided to a common receptacle 24.

The first liquid supply circuit 13 comprises a beverage brewing unit 23 fluidly downstream the heating unit 13*b*. The beverage brewing unit preferably comprises a cartridge receiving chamber into which a cartridge can be selectively inserted by a user. The second liquid supply circuit 14 directly ends by an outlet 11*b* without passing through a beverage brewing unit. As a result, liquid is not charged with beverage or flavouring ingredients contained in a cartridge before being delivered in the receptacle. It is to be noted that the second liquid supply circuit 14 could comprise a dedicated brewing unit for selectively inserting a beverage ingredients or flavour containing cartridge.

Figure 6:
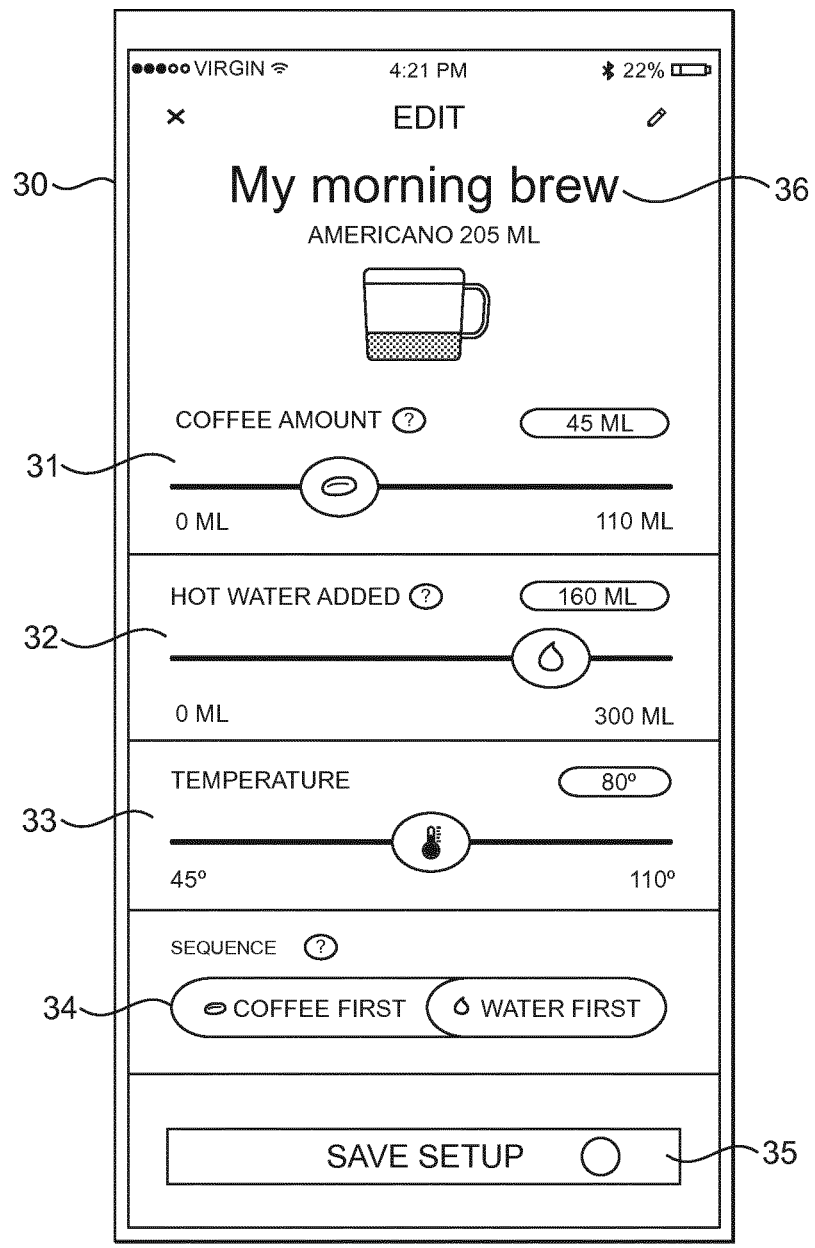
FIG. 6 is a screenshot of a preferred embodiment of a control interface of the computer program respectively the electronic device according to the invention.

FIG. 6 is an exemplary embodiment of a control interface 30 provided by the computer program executable on an electronic device 1 according to the invention. The control interface 30 is preferably displayed on a touchscreen of the electronic device 1. The computer program to configure the interface is preferably an application ("app") stored and executable on a handheld device such as a mobile phone or tablet computer.

The control interface 30 is designed for individually setting a volume parameter of the first and second liquid supply circuit. The control interface 30 preferably comprises a first slidable control element 31 which is designed for setting a volume parameter for the first liquid supply circuit 13, by means of which for example a coffee beverage is prepared. As depicted in the figure, the first slidable control element 31 may set a volume parameter for the first liquid supply circuit 13 to a value between 0 to 110 ml.

The control interface 30 preferably further comprises a second slidable control element 32 which is designed for setting a volume parameter for the second liquid supply circuit 14, by means of which for example hot water may be provided to the receptacle 24. As depicted in the figure, the second slidable control element 32 may set a volume parameter for the second liquid supply circuit 14 to a value between 0 to 300 ml.

The control interface 30 preferably further comprises a third slidable control element 33 which is designed for setting a desired in-cup temperature of the resulting composite beverage in the receptacle 24. As depicted in the figure, the composite temperature of the beverage may be set to a value of between 45° C. and 110° C. The control interface 30 may further comprise an additional control element which is designed for individually setting a desired temperature value for the first and second liquid supply circuit.

The slidable control elements 31, 32, 33 are preferably graphical cursors enabling an incremental change of the parameter values and which can be individually controlled by touch.

The control interface 30 preferably comprises a further control element 34 which is designed for setting a desired liquid sequence for liquid provided from the first and second liquid supply circuit 13, 14, such as "coffee first" or "water first".

The control interface 30 preferably further comprises a storage or save button 35 by means of which a desired parameter set for the above-mentioned parameters may be saved to a memory of the electronic device 1 or of the connected beverage preparation machine 10. The parameter set may in particular be saved under an arbitrary name for a beverage preparation profile (here: "My morning brew") such as depicted in a headline portion 36 of the control interface 30. As previously mentioned, the computer program is preferably designed for individually creating different beverage preparation profiles and storing them on the electronic device or the beverage preparation machine. Further, different beverage preparation profiles 36 may be selectively or automatically retrieved from a remote resource 20a when connecting the electronic device 1 thereto. The beverage preparation profiles 36 from the remote resource 20a may be stored automatically or upon user selection to the electronic device or of the beverage preparation machine.

The computer program executable on the electronic device may be designed to selectively upload to the remote resource 20a beverage preparation profiles 36 that are created with the computer program. The individual creations by the consumer may then be stored at the remote resource 20a and downloaded by other consumers. A consumer may thus share his personally created recipes with other consumers and users of the computer program.

As previously described, the computer program may be designed for transmitting the actual values for the different parameters from the beverage preparation machine 10 and display them in the control interface 30 such as to be adapted by the user before preparing a subsequent beverage from the machine 10.

The beverage preparation process may be initiated by a user by pressing e.g. the headline portion 36 of the control interface. The computer program will then transmit the desired beverage preparation parameters to the machine 10 via the network units 3, 16, which parameters will then be used by the control unit 15 of the machine 10 in order to correspondingly control the beverage preparation process via the first and second liquid supply circuit 13, 14.

In a preferred embodiment, the computer program according to the invention and/or the control unit 15 of the machine is designed to adapt the temperature for the liquid delivered by the first and second liquid supply circuit 13, 14 in order to obtain a desired in-cup temperature of the composite beverage as selected by a user via the slidable control element 33. For this purpose, the memory unit 10 of the beverage preparation machine 10 or the memory unit 6 of the electronic device 1 may comprise a dedicated configuration program or parameter table based on which the respective individual values for the heating unit 13b, 14b of the first and second liquid supply circuit 13, 14 can be calculated.

The invention claimed is:

1. A beverage preparation machine for preparing a liquid beverage from a cartridge, the machine comprising:
   a first liquid supply circuit comprising a first liquid reservoir and configured for selectively providing a first liquid of a first predefined temperature and/or a first volume from the first liquid reservoir to the cartridge inserted into the beverage preparation machine;
   a second liquid supply circuit comprising a second liquid reservoir and configured for selectively providing a second liquid of a second predefined temperature and/or a second volume from the second liquid reservoir to a liquid delivery outlet of the beverage preparation machine, the beverage preparation machine has a configuration selected from the group consisting of (i) the first and second liquid reservoirs are the same liquid reservoir and (ii) the first and second liquid reservoirs are separate liquid reservoirs;
   a control unit comprising a processor and configured for controlling the first and second liquid supply circuits;
   a network unit comprising a network interface for communication with an external electronic device over a network;
   wherein the control unit is configured to individually control the selective provision of liquid from the first and the second liquid supply circuits in response to information obtained via the network unit; and
   wherein the control unit is configured to individually control the first and second predefined temperatures and/or the first and second volumes of the first and second liquids respectively delivered from the first and second liquid supply circuits.

2. The beverage preparation machine according to claim 1, wherein the liquid delivery outlet of the second liquid supply circuit and a beverage delivery outlet of the first liquid supply circuit are arranged such as to deliver the respective liquids into a common receptacle.

3. The beverage preparation machine according to claim 1, wherein the first and second liquid supply circuits each comprise a pump and a heating unit.

4. The beverage preparation machine according to claim 3, wherein the heating unit of the first liquid supply circuit is a thermoblock or tube heater and the heating unit of the second liquid supply circuit is a boiler.

5. The beverage preparation machine according to claim 1, wherein the control unit is configured to individually set the first and second temperatures of the first and second liquids delivered by the first and/or second liquid supply circuit to a value between 70° C. and 95° C.

6. The beverage preparation machine according to claim 1, wherein the control unit is configured to control a sequence of delivery of the respective liquid from the first and second liquid supply circuits into a common receptacle.

7. The beverage preparation machine according to claim 1, wherein the network interface of the network unit is a wireless interface.

8. A computer program executable on an electronic device, the computer program being configured to:
   obtain via a network unit of the electronic device a network connection to a beverage preparation machine;
   display a control interface for individually setting a first temperature and/or a first volume parameter for a first liquid delivered by a first liquid supply circuit and a second temperature and/or a second volume parameter for a second liquid delivered by a second liquid supply circuit of the beverage preparation machine; and
   transmit via the network connection the first and second temperatures and/or the first and second volume parameters for the first and second liquid supply circuits to the beverage preparation machine upon a user input.

9. The computer program according to claim 8, wherein the computer program is further configured to obtain a parameter regarding a sequence of delivery of the first and second liquids from the first and second liquid supply circuits and transmit the respective parameter to the beverage preparation machine.

10. The computer program according to claim 8, wherein the computer program is further configured to obtain from a memory unit of the beverage preparation machine or the electronic device predefined default values for the respective parameters that may be selectively adapted by the user via the control interface.

11. The computer program according to claim 8, wherein the computer program is adapted for attributing a respective parameter set to a beverage preparation profile that is saved to and selectively retrievable from a beverage library stored in a memory unit of the beverage preparation machine or of the electronic device.

12. The computer program according to claim 8, wherein the computer program is configured to automatically or upon user request obtain via the network unit of the electronic device a network connection to a remote resource for data transfer.

13. The computer program according to claim 12, wherein the computer program is configured to selectively and/or automatically retrieve beverage preparation parameters or beverage preparation profiles from the remote resource.

14. The beverage preparation machine according to claim 1, wherein the first and second liquid reservoirs are the same liquid reservoir.

15. The beverage preparation machine according to claim 1, wherein the first and second liquid reservoirs are separate liquid reservoirs.

16. The beverage preparation machine according to claim 1, wherein the control unit is configured to individually set the first and second predefined temperatures of the first and second liquids delivered by the first and second liquid supply circuits to a value between 80° C. and 90° C.

17. The beverage preparation machine according to claim 16, wherein the first liquid supply circuit comprises a first heater, and the second liquid supply circuit comprises a second heater, and the first heater and the second heater are individually controlled for heating the first and second liquids to reach at least two to six distinct temperature values between 80° C. and 90° C.

18. The beverage preparation machine according to claim 17, wherein the at least two to six distinct temperature values are each selected from the group consisting of 80° C., 82° C., 84° C., 86° C., 88° C. and 90° C.

19. The computer program according to claim 8, wherein the control interface is configured to individually set the first and second temperatures of the first and second liquids respectively delivered by the first and second liquid supply circuits to a value between 80° C. and 90° C.

20. The computer program according to claim 8, wherein a first heater of the first liquid supply circuit and a second heater of the second liquid supply circuit are individually controlled for heating the first and second liquids to reach at least two to six distinct temperature values between 80° C. and 90° C.

* * * * *